ETHER-AMINES USED AS GELATIN HARDENERS

Delbert D. Reynolds and John F. Tinker, Rochester, N.Y., assignors to Eastman Kodak Company, Rochester, N.Y., a corporation of New Jersey
No Drawing. Filed Aug. 28, 1962, Ser. No. 220,031
29 Claims. (Cl. 96—111)

This invention relates to the hardening of gelatin with ether-amines characterized in that each molecule thereof has a ROCH₂N—R' group therein, R and R' each being alkyl or alkylene.

In the photographic art investigators are always on the lookout for compounds which satisfactorily harden photographic gelatin, are photographically inert, and of sufficient structure that they do not migrate to any appreciable extent from one layer to another.

One object of our invention is to provide hardeners for gelatin which are polyfunctional and contain alkoxymethylamine groups therein. Another object of our invention is to provide hardeners for gelatin which are photographically inert. A further object of our invention is to provide gelatin hardeners which resist migration from layer to layer. Other objects of our invention will appear herein.

We have found that certain alkoxymethylamines which are polyfunctional in nature are useful as hardeners for gelatin and are particularly useful within the range of concentration of 1–5% based on the weight of the gelatin. However, even in lesser or greater concentrations these alkoxymethylamines have an effect on the gelatin in that the resistance to swelling is increased and the gelatin layers prepared from compositions containing the same are considerably more resistant to water at an elevated temperature than gelatin layers containing no hardener.

The gelatin hardeners which are useful for mixing with gelatin to form compositions in accordance with our invention are polyfunctional alkoxymethylamines having for each unit or molecule the group ROCH₂—N—R' in which R and R' are each either alkyl or alkylene. The invention contemplates as hardening compounds both those having ring nitrogens and aliphatic-type compounds containing alkoxymethylamine structures therein. Although the preferred amount of hardener for use is 1–5% based on the weight of the gelatin, in some cases it may be desirable to use amounts of hardener outside of these limits which amounts have a hardening effect. The percentage of hardener to use will be governed to some extent by the degree of hardening desired in the gelatin layer. A large portion of the compounds useful for hardening gelatin may be referred to as bifunctional alkoxymethylamines. However, in the case of certain ring structures, this language loosely applies to the compounds which are useful.

The compounds useful as hardeners are conveniently prepared by reacting an amine either a simple amine or a polyfunctional amine with formaldehyde in the presence of an alcohol. In some cases, the alcohols may be built into amines. In those instances, further alcohol need not be supplied for the reaction to go in the desired manner. The use of compounds which have been quaternized is outside of our invention.

The hardening agents in accordance with our invention may be in the form of polymers such as made up of a number of recurring units or they may be compounds of a more simple type. A great number of the compounds contemplated in accordance with our invention as being useful for gelatin hardeners are of the water-soluble type which contributes to good miscibility with aqueous gelatin solutions. The invention also includes compounds in accordance with our invention which are water-insoluble and it is desirable that these be used in the form of their aqueous dispersions or in the form of solvent solutions when supplied to aqueous solutions of gelatin.

One type of compounds useful as hardeners for gelatin are those having the following formulae:

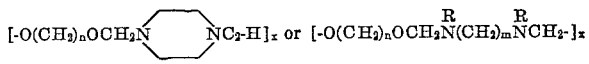

in which R is H or lower alkyl, $n$ and $m$ are numbers from 2 to 10 and $x$ is a number which may extend up to 500, 1,000 or even more. Another type of compounds useful for hardening in accordance with our invention is the alkoxymethyl heterocyclic amines; the following two compounds being representative of compounds of this nature:

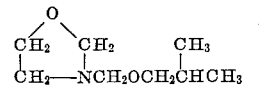

3-isobutoxymethyl oxazolidine

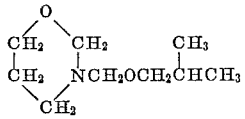

3-isobutoxymethyl tetrahydro-1,3-oxazine

Instead of isobutyl other alkyl groups of 2 to 10 carbon atoms may be used. The heterocyclic rings may be replaced by similar heterocyclic rings provided the nitrogen is joined to alkylene or alkyl groups. Instead of the monoheterocyclic amines, also contemplated as hardeners in accordance with our invention are the biheterocyclic amines illustrated by the following formula:

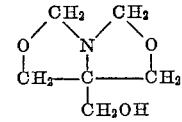

5-hydroxymethyl-3,7-dioxa-1-azabicyclo[3,3,0]octane

Other types of compounds which are useful as hardeners in photographic emulsions in accordance with our invention are those of the open-chain type; the following being an example:

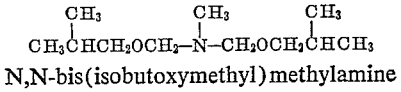

N,N-bis(isobutoxymethyl)methylamine

Instead the nitrogen may be supplied in the form of a piperazine configuration or a di-sec. amine, the remainder of the compound being linear. The following illustrates the types of compounds:

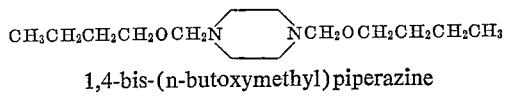

1,4-bis-(n-butoxymethyl)piperazine

Another similar type of hardener may be prepared by reacting a di-secondary amine with formaldehyde and an alcohol. For instance 22 grams of N,N'-dimethyl hexamethylene diamine was refluxed with 9 grams of paraformaldehyde, and 200 ml. of ethanol together with 200 ml. of benzene. Benzene-ethanol-water azeotrope was removed by distillation. The product, N,N'-bisethoxymethyl-N,N'-dimethyl hexamethylene diamine, was separated by distillation. It is a useful hardener for gelatin. Hardeners of this type may be represented by the formula:

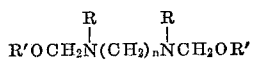

wherein R and R' are alkyl groups of 1-4 carbon atoms and $n$ is 2 to 10.

Although these hardeners are primarily of interest for incorporating into gelatin compositions to form hardened layers thereof, also contemplated are hardening procedures in which a gelatin layer is treated with a solution containing the hardeners such as in processing operations or the like. Although simpler type compounds containing the structure as prescribed will be useful for hardening gelatin, as a rule the use of compounds of higher molecular weights such as greater than 150 are considered as the most useful.

Various methods of making hardeners useful in compositions in accordance with the invention are the following:

Example 1

300 grams (10 moles) of paraformaldehyde were stirred into 1.5 liters of isobutanol. 400 grams of 40% aqueous methylamine were added with stirring. The mass was refluxed and the isobutanol-water azeotrope was removed by means of a trap. When water was no longer formed, the reaction product was distilled. There was obtained N,N-bis(isobutoxymethyl)methylamine which is useful as a hardener for gelatin.

Example 2

420 grams of piperazine were mixed with 300 grams of paraformaldehyde in 3 liters of n-butanol and the mass was refluxed. The water formed during the reaction was removed as an n-butanol-water azeotrope by means of a trap. When water was no longer formed, the product was distilled. Obtained thereby was 1,4-bis(n-butoxymethyl)piperazine. This material was useful as a hardener for gelatin when employed in aqueous compositions thereof.

Example 3

311 grams of 2-amino-2-hydroxymethyl-1,3-propanediol were mixed with 154 grams of paraformaldehyde and the mass was refluxed in 500 ml. of toluene. The toluene-water azeotrope formed was removed by means of a trap. The cooled reaction mixture gave a crystalline product which was distilled to obtain 5-hydroxymethyl-3,7-dioxa-1-azabicyclo[3.30]octane. This material was found to be useful as a hardener for gelatin.

Example 4

280 grams of paraformaldehyde were dissolved in 1.4 liters of isobutanol and 360 grams of 3-aminopropanol were added thereto. The mass was refluxed, the water being removed as the isobutanol azeotrope. By distillation, there was obtained 3-isobutoxymethyl-tetrahydro-1,3-oxazine which showed gelatin hardening properties when employed for that purpose.

Example 5

59.4 grams of 1,10-decanediol and 67.3 grams of 1,4-bis(ethoxymethyl)piperazine were mixed and were stirred under nitrogen. The mass was then heated in a 175° C. oil bath for 2 hours. Ethanol formed and was allowed to distill off at atmospheric pressure. At the end of the 2 hours a vacuum pump was attached to the reaction flask and the reaction was continued for 1 hour. Removal of the ethanol drives the reaction to completion. There was obtained a polymeric material having the formula:

$$[-O(CH_2)_{10}OCH_2N\diagup\diagdown NCH_2-]_x$$

Example 6

The same procedure was followed as described in the preceding example except that a 135° C. bath was employed and 59 grams of 1,6-hexanediol mixed with 101 grams of 1,4-bis(ethoxymethyl)-piperazine were used. The polymeric material obtained had the formula:

$$[-O(CH_2)_6OCH_2N\diagup\diagdown NCH_2C-]_x$$

Both the materials in Examples 5 and 6 were found to be useful gelatin hardeners as was the product obtained when butanediol was employed in a like reaction.

The various hardeners referred to above are useful for hardening gelatin either in aqueous gelatin compositions or when present in gelatin-silver halide photographic emulsions. Because of the photographic inertness of these hardeners they are useful for hardening emulsions without producing adverse photographic effects therein. The hardeners listed in the following table were added to separate portions of a silver bromoiodide photographic emulsion in the amounts indicated each portion being then coated on a cellulose acetate support and dried. Samples of each coating were then exposed on an Eastman 1b Sensitometer and processed for 5 minutes in Kodak Developer DK-50, fixed, washed and dried with the indicated sensitometric results. The coatings were also tested for swell properties and melting point.

| Hardener | Gms. hardener/ 100 gms. gelatin | Rel. Speed | $\gamma$ | Fog | Swell | Melting Point, °F. |
|---|---|---|---|---|---|---|
| Control | | 304 | 1.10 | 0.11 | 573 | 89 |
| 3-isobutoxymethyl-tetrahydro-1,3-oxazine | 1 | 310 | 0.95 | 0.13 | 357 | 212 |
| 5-hydroxymethyl-3,7-dioxa-1-azabicyclo[3.3.0]octane | 1 | 293 | 0.90 | 0.10 | 200 | 200 |
| | 5 | 288 | 0.80 | 0.10 | 126 | 200 |

Samples of hardeners were added to separate portions of a sulfur and gold sensitized high speed silver bromoiodide gelatin emulsion which had been panchromatically sensitized by the addition of a cyanine dye. The emulsion contained 245 grams of gelatin per mole of silver halide. Each coating sample was coated on a cellulose acetate support at a coverage of 430 mg. of silver per square foot. A sample of each coating was exposed on an Eastman 1b Sensitometer and processed for 5 minutes in Kodak Developer DK-50, fixed, washed and dried with the following results:

| Hardener | Conc., Gms./ mole Ag | Rel. Speed | $\gamma$ | Fog | Ret., °F. | Melt. Pt., °F. | Percent Swell |
|---|---|---|---|---|---|---|---|
| Control | | 100 | 1.20 | .10 | 78 | 88 | 682 |
| 5-hydroxymethyl-1-aza-3,7-dioxa bicyclo(3.3.0)octane | 1 | 91 | .96 | .09 | None | 204 | 229 |
| | 5 | 83 | .90 | .08 | None | 212 | 133 |
| 5-methyl-1-aza-3,7-dioxa bicyclo(3.3.0)octane | 1 | 87 | .90 | .09 | None | 198 | 280 |
| | 5 | 80 | .74 | .09 | None | 212 | 109 |

These were added to gelatin-silver halide photographic emulsions polymeric hardeners as listed in the form of 2% solutions in methyl alcohol. These emulsion samples were then coated out onto a cellulose acetate film support and various tests were performed thereon in like manner as referred to in the previous examples. The results obtained were as follows:

| Hardener | Gms./100 gms. of gelatin | Rel. Speed | γ | Fog | Melting Point, °F. | Percent Swell |
|---|---|---|---|---|---|---|
| Control | | 100 | 1.20 | 0.11 | 89 | 734 |
| [—O(CH$_2$)$_2$OCH$_2$N⟨⟩NCH$_2$—]$_x$ | 5 | 95 | 0.55 | 0.37 | 211 | 182 |
| [—O(CH$_2$)$_4$OCH$_2$N⟨⟩NCN$_2$—]$_x$ | 5 | 100 | 0.73 | 0.19 | 212 | 220 |
| [—O(CH$_2$)$_6$OCH$_2$N⟨⟩NCH$_2$—]$_x$ | 5 | 95 | 0.72 | 0.19 | 212 | 226 |
| Control | | 100 | 1.15 | 0.13 | 86 | 752 |
| [—(OC$_2$H$_4$)$_2$OCH$_2$N⟨⟩NCH$_2$—]$_x$ | 6 | 89 | 0.78 | 0.07 | 212 | 156 |
| [—(OC$_2$H$_4$)$_3$OCH$_2$N⟨⟩NCH$_2$—]$_x$ | 3 | 76 | 0.90 | 0.09 | 212 | 257 |
| [—OCH$_2$CH$_2$N⟨⟩NCH$_2$CH$_2$OCH$_2$N⟨⟩NCH$_2$—]$_x$ | 3 | 89 | 1.00 | 0.07 | 202 | 227 |

The melting points of the gelatin coatings were determined by placing the samples in water and slowly heating the water to the point at which the layer disintegrates from the film base, this point being recorded. The swell measurements were made in a Carson Dice microdensitometer which is employed to measure the dry emulsion thickness. The sample is then immersed in distilled water at 68° F., removed from the water bath and then remeasured in the microdensitometer. The increase in thickness in terms of percentage is the swell value of the sample.

In the case of the polymeric hardeners in accordance with our invention, the degree of polymerization is not critical. The hardeners having a lower degree of polymerization are water-soluble while as the degree of polymerization increases the hardener material must be incorporated in the gelatin solution in the form of its solution in an organic solvent or in the form of an aqueous dispersion.

Polymeric hardeners in accordance with our invention can be used in photographic emulsions for use in diffusion transfer processes such as those described in U.S. Patent No. 2,352,014 of Rott and in U.S. Patents Nos. 2,584,029, 2,698,236 and 2,543,181 of Land as well as in color transfer processes as described in Belgian Patents Nos. 554,933 and 554,934 of Polaroid and Belgian Patents Nos. 585,686 and 603,747 of Kodak.

We claim:
1. A composition of matter comprising gelatin containing a hardening amount of a compound selected from those having the formulas:

(1) R'OCH$_2$OCH$_2$OR', (2) [—O(CH$_2$)$_n$OCH$_2$YCH$_2$—]$_x$, (3) [—(OC$_2$H$_4$)$_2$OCH$_2$—N⟨⟩N—CH$_2$—]$_x$, (4) [—OCH$_2$CH$_2$—N⟨⟩N—CH$_2$CH$_2$OCH$_2$N⟨⟩N—CH$_2$—]$_x$, (5) 3-isobutoxymethyl-tetrahydro-1,3-oxazine,
(6) 5-methyl-1-aza-3,7-dioxa bicyclo(3.3.0)octane,
(7) 5 - hydroxymethyl - 1 - aza - 3,7 - dioxa bicyclo (3.3.0)octant, and
(8) 3-isobutoxymethyl oxazolidine, wherein each R' represents a lower alkyl group, Q represents —N⟨⟩N—, —$\overset{R}{N}$—$\overset{R}{N}$— or —$\overset{R}{N}$(CH$_2$)$_m$N—, Y represents —N⟨⟩N— or —$\overset{R}{N}$(CH$_2$)$_m$$\overset{R}{N}$— z represents 2 or 3, each R represents a lower alkyl group, each m is an integer of 2–10, n is an integer of 2–10 and each x is a number from 1 to 5,000 and wherein when x is 1 the terminal valence bonds are attached to hydrogen.

2. A composition of matter comprising gelatin containing a hardening amount of a compound having the formula:

R'OCH$_2$—N⟨⟩N—CH$_2$OR' wherein each R' represents a lower alkyl group.

3. A composition of matter comprising gelatin containing a hardening amount of a compound having the formula:

R'OCH$_2$—$\overset{R}{N}$—CH$_2$OR' wherein R and R' each represent a lower alkyl group.

4. A composition of matter comprising gelatin containing a hardening amount of a compound having the formula:

R'OCH$_2$—$\overset{R}{N}$(CH$_2$)$_m$$\overset{R}{N}$—CH$_2$OR' wherein each R and each R' represent a lower alkyl group and m is an integer of 2–10.

5. A composition of matter comprising gelatin containing a hardening amount of a compound having the formula:

[—O(CH$_2$)$_n$OCH$_2$—N⟨⟩N—CH$_2$—]$_x$ wherein n is an integer of 2–10, x is a number from 1 to 5,000 and wherein when x is 1 the terminal valence bonds are attached to hydrogen.

6. A composition of matter comprising gelatin containing a hardening amount of a compound having the formula:

[—O(CH$_2$)$_n$OCH$_2$—$\overset{R}{N}$(CH$_2$)$_m$$\overset{R}{N}$—CH$_2$—]$_x$ wherein each R represents a lower alkyl group, m is an integer of 2–10, n is an integer of 2–10 and x is a number from 1 to 5,000 and wherein when x is 1 the terminal valence bonds are attached to hydrogen.

7. A composition of matter comprising gelatin containing a hardening amount of a compound having the formula:

[—(OC$_2$H$_4$)$_z$OCH$_2$—N⟨⟩N—CH$_2$—]$_x$ wherein z represents 2 or 3 and x is a number from 1 to 5,000 and wherein when x is 1 the terminal valence bonds are attached to hydrogen.

8. A composition of matter comprising gelatin containing a hardening amount of a compound having the formula:

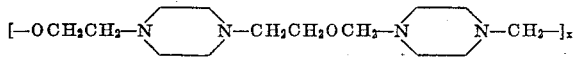

wherein $x$ is a number from 1 to 5,000 and wherein when $x$ is 1 the terminal valence bonds are attached to hydrogen.

9. A composition of matter comprising gelatin containing therein a hardening amount of 3-isobutoxymethyl oxazolidine.

10. A composition of matter comprising gelatin containing therein a hardening amount of a polymeric material consisting essentially of the recurring unit:

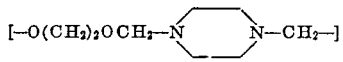

11. A composition of matter comprising gelatin containing therein a hardening amount of a polymeric material consisting essentially of the recurring unit:

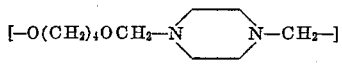

12. A composition of matter comprising gelatin containing therein a hardening amount of a polymeric material consisting essentially of the recurring unit:

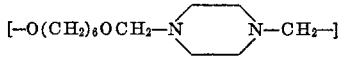

13. A composition of matter comprising gelatin containing therein a hardening amount of a polymeric material consisting essentially of the recurring unit:

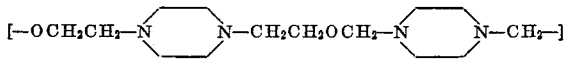

14. A gelatin-silver halide photographic emulsion containing therein a hardening amount of a compound defined by claim 1.

15. A gelatin-silver halide photographic emulsion containing therein a hardening amount of a compound defined by claim 2.

16. A gelatin-silver halide photographic emulsion containing therein a hardening amount of a compound defined by claim 3.

17. A gelatin-silver halide photographic emulsion containing therein a hardening amount of a compound defined by claim 4.

18. A gelatin-silver halide photographic emulsion containing therein a hardening amount of a compound defined by claim 5.

19. A gelatin-silver halide photographic emulsion containing therein a hardening amount of a compound defined by claim 6.

20. A gelatin-silver halide photographic emulsion containing therein a hardening amount of a compound defined by claim 7.

21. A gelatin-silver halide photographic emulsion containing therein a hardening amount of a compound defined by claim 8.

22. A gelatin-silver halide photographic emulsion containing therein a hardening amount of a compound defined by claim 10.

23. A gelatin-silver halide photographic emulsion containing therein a hardening amount of a compound defined by claim 11.

24. A gelatin-silver halide photographic emulsion containing therein a hardening amount of a compound defined by claim 12.

25. A gelatin-silver halide photographic emulsion containing therein a hardening amount of a compound defined by claim 13.

26. A composition of matter comprising gelatin containing a hardening amount of a compound selected from the group consisting of 3-isobutoxymethyl-tetrahydro-1,3-oxazine, 5-methyl-1-aza-3,7-dioxa bicyclo(3.3.0)octane, 5-hydroxymethyl-1-aza-3,7-dioxa bicyclo(3.3.0)octane and 3-isobutoxymethyl oxazolidine.

27. A composition of matter comprising gelatin containing therein a hardening amount of 3-isobutoxymethyl-tetrahydro-1,3-oxazine.

28. A composition of matter comprising gelatin containing therein a hardening amount of 5-hydroxymethyl-1-aza-3,7-dioxa bicyclo(3.3.0)octane.

29. A composition of matter comprising gelatin containing therein a hardening amount of 5-methyl-1-aza-3,7-dioxa bicyclo(3.3.0)octane.

References Cited

UNITED STATES PATENTS

| 3,020,250 | 2/1962 | Norwalk | 260—6 |
| 3,130,172 | 4/1964 | Harvey et al. | 260—6 |

NORMAN G. TORCHIN, *Primary Examiner.*

D. J. ARNOLD, *Assistant Examiner.*